May 24, 1932.    J. DE LA CIERVA    1,859,584
AIRCRAFT WITH ROTATIVE WINGS
Filed Nov. 1, 1926
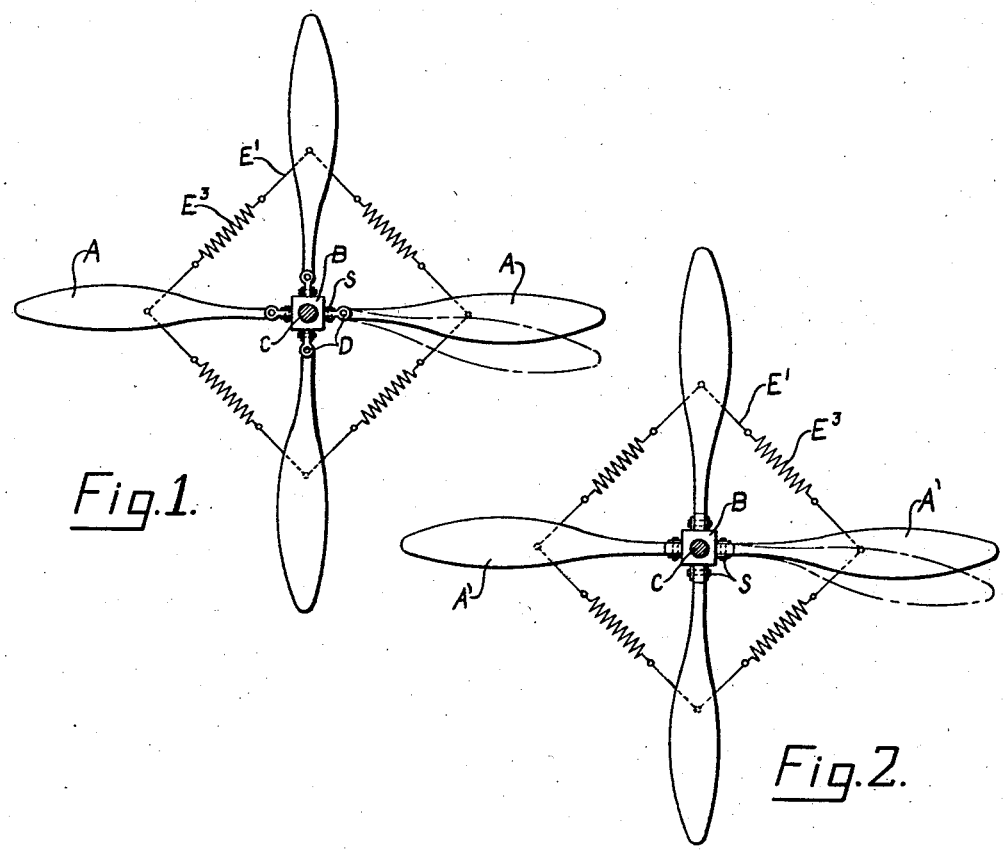
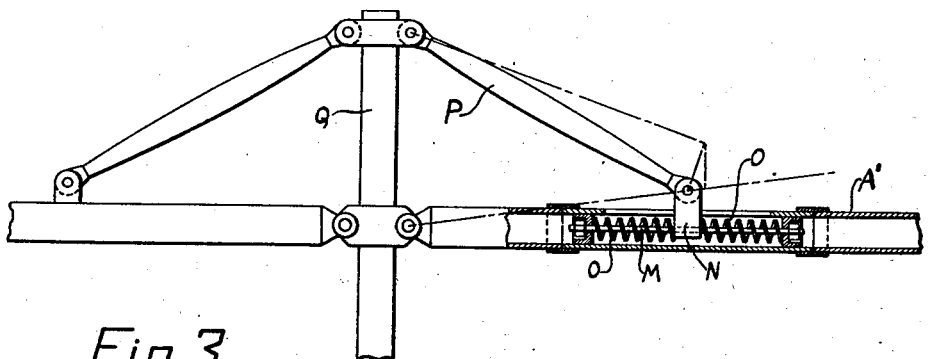
INVENTOR.
Juan de la Cierva
BY
ATTORNEYS.

Patented May 24, 1932

1,859,584

UNITED STATES PATENT OFFICE

JUAN DE LA CIERVA, OF MADRID, SPAIN, ASSIGNOR, BY MESNE ASSIGNMENTS, TO AUTOGIRO COMPANY OF AMERICA, OF PHILADELPHIA, PENNSYLVANIA, A CORPORATION OF DELAWARE

AIRCRAFT WITH ROTATIVE WINGS

Application filed November 1, 1926, Serial No. 145,655, and in Great Britain November 19, 1925.

This invention relates to aircraft of the type embodying a wing system which rotates freely in flight by reason of the action of the air flow on the wings and in which the wings are hinge-jointed to a member constituting their common centre of rotation in such a manner that each wing is free to adopt at all times positions in which the centrifugal force due to rotation and the lift are in equilibrium. Aircraft of this general type are disclosed in my Patent No. 1,590,497, issued June 29th, 1926, (corresponding to my British Patent No. 196,594) and the present invention is primarily directed to improvements in the construction and mounting of the wings and of their supporting structure.

During rotation of the wing system, variations in aerodynamical incidence and in the resultant relative speeds of the wings due to the difference in pressure upon them in different angular positions about the axis of rotation give rise to forces tending to set up injurious stresses in the wing system. It is therefore advisable to brace the wings together. Rigid connections are undesirable since the wings, due to their being hingedly jointed to the axis of rotation, are permitted a variable beating movement.

According to the present invention the wings are either built with sufficient resilience in their construction to permit their small relative displacement in the plane of rotation or they are provided with secondary hinge joints to the supporting member constituting their common centre of rotation, said secondary hinge joints being at right angles to the primary hinge joints and approximately parallel to the general axis of rotation so that the wings are permitted a certain relative angular displacement in the plane of rotation. They are then connected one to another by flexible members (for instance steel cables) held in tension by elastic means.

The above and further constructional details of the present invention are illustrated in the accompanying drawings which are given as constructional examples only, such as to enable those skilled in the art readily to understand and carry the invention into practice.

In these drawings:—

Figure 1 is a plan view of a rotative hinged wing system showing the primary and secondary hinge joints and yielding means for controlling wing movements;

Figure 2 is a view similar to Figure 1 but illustrating a modified arrangement employing flexible wing structures; and Figure 3 illustrates more or less diagrammatically a means for restricting the beating movement of the wings.

In accordance with the arrangement of Figure 1, the wings A are horizontally hinged to the member B by primary or horizontal hinge joints S positioned substantially at right angles to the shaft C, such member B being rotative on the shaft C. In this form, the wings also have secondary hinge joints D substantially perpendicular to the primary horizontal hinge joints S. To prevent excessive displacement and to relieve the stresses in the wings, they are braced together by flexible elements such as cables E' which may embody elastic elements such as springs $E^3$. As shown in the drawings, the hinge joints or pivots for the wings are located substantially in the plane thereof which further reduces stresses and enhances the operation of such an aerodynamically actuated wing system, as compared with the arrangement shown in my said prior patent.

In the arrangement of Figure 2, the seconndary hinge joints have been omitted and, as here shown, the wings A' may be constructed with some lateral resilience to permit of their relative displacement viewed in plan. This arrangement also embodies the primary hinge joints S and the flexible and elastic elements E' and $E^3$, respectively.

Referring now to Figure 3 it may prove desirable in some cases to restrict the free swinging movement of the wings for the reason that, as previously arranged, the action of a sudden strong wind on the wings while they are at rest may lift them considerably and subject them to heavy strains in falling back. To guard against this and also to support the wings when at rest they may be resiliently stayed in such a manner that whilst there is little or no interference with their movement between their useful limits nevertheless extreme movements in either direction are prevented.

Inside the wing A', so as to diminish head resistance is mounted a rod M on which is a slide N mounted between springs O. The slide N is hinged to a strut P which is in turn hinged to an extension of the shaft Q on which the wing system rotates. It will thus be seen that excessive movements of the wings in either direction are prevented. If it is preferred not to limit the wings upward movement the slide N may be loaded or sprung in one direction only, this arrangement having the advantage over previously proposed constructions that the bulkiest part of the means for supporting the wings when at rest is enclosed within the wing structure and produces no additional head resistance.

What I claim is:—

1. In an aircraft, a substantially upright common axis, a movable sustaining unit having a plurality of blades rotatably mounted with respect to the axis, and means providing for individual blade displacement to positions of substantial equilibrium between centrifugal and lift forces and between forces acting fore and aft in the general plane of rotation.

2. In an aircraft, a substantially upright common axis, a movable sustaining unit having a plurality of blades substantially freely rotatably mounted about said common axis for actuation by relative air-flow, and means providing for individual blade displacement to positions of substantial equilibrium between centrifugal and lift forces and between forces acting fore and aft in the general plane of rotation.

3. An aircraft having a set of movable sustaining blades or wings and a mounting structure therefor including means providing for rotation of the set about a common axis, said wings being flexibly arranged with respect to the mounting in such manner as to provide freedom for relative movement thereof forwardly and rearwardly in, and substantially transversely of, their general path of rotative travel in addition to said common rotation.

4. An aircraft having a set of movable sustaining blades or wings normally actuable by relative air-flow and a mounting structure therefor including means providing for rotation of the set about a common axis under the action of such air-flow, said wings being flexibly arranged with respect to the mounting in such manner as to provide freedom for relative movement thereof in and substantially transversely of their general path of rotative travel in addition to said common rotation.

5. For an aircraft, an air actuated sustaining wing system including an upwardly extending rotatively mounted axis structure, wing means positioned and mounted for rotative actuation thereabout under the action of relative air-flow in flight, said wing means being mounted in such manner as to be restrained as against appreciable bodily change in pitch setting, and means whereby said wing means may swing forwardly and rearwardly with respect to the rotative path of travel and substantially freely upwardly and downwardly to permit automatic variation in their effective aerodynamic angle of attack and to compensate automatically for variations in forces imposed upon them in flight.

6. For aircraft, a supporting system comprising rotative wings, a hub member suitably connected to the body of the aircraft and constituting the common axis of rotation of said wings, and articulated joints connecting the roots of the wings to the said hub member and permitting independent angular displacement of the wings in two planes which are at right angles to one another.

7. For aircraft, a supporting system comprising rotative wings, a hub member suitably connected to the body of the aircraft and constituting the common axis of rotation of the wings, hinge joints connecting the roots of the wings independently to the said hub member and permitting said wings to swing above and below the mean plane of rotation in response to the centrifugal and lift forces upon them during rotation, and secondary hinge joints having axes substantially parallel to the general axis of rotation and permitting relative angular displacement of the wings in the plane of rotation.

8. An aircraft having a set of sustaining blades and a mounting therefor including means providing for rotation of the set about a common generally vertical axis and means providing for relative pivotal movements of the blades in and with respect to the general path of travel thereof, the last mentioned means including pivot parts joined to each other for relative movement on at least two axes.

9. An aircraft having a set of sustaining blades and a mounting therefor including means providing for rotation of the set about a common generally vertical axis and means providing for relative pivotal movements of the blades in and with respect to the general path of travel thereof, the last mentioned means including pivot parts joined to each other for relative movement on at least two axes one of which is substantially vertically disposed and another of which is substantially horizontally disposed.

10. In an aircraft, a rotating sustaining wing system including a substantially upright axis structure, wings positioned therearound, and for each wing a connection to said axis structure including an individual pivot axis providing for swinging movement of the wing generally transverse its rotative path of travel and an individual pivot axis providing for swinging movement of the wing forwardly and rearwardly in the general path of its rotative travel, whereby to compensate for irregularities in flight forces, each wing being restrained as against bodily rocking about its own longitudinal axis.

11. In an aircraft, an air driven rotating sustaining wing system including a substantially upright axis structure mounted for free rotation, wings positioned therearound for free rotation under the action of relative air-flow in flight, and for each wing a connection to said axis structure including an individual pivot axis providing for swinging movement of the wing generally transverse its rotative path of travel and an individual pivot axis providing for swinging movement of the wing forwardly and rearwardly in the general path of its rotative travel whereby to compensate for irregularities in flight forces, each wing being restrained as against bodily rocking about its own longitudinal axis.

12. For an aircraft, a sustaining wing system including a generally upright axis structure, sustaining blades or wings mounted for rotation about the axis structure, a substantially upright pivot for each wing serving to connect the wing with the axis structure, and substantially horizontal pivot means for the wings disposed intermediate the upright pivots.

13. An aircraft having a set of movable sustaining blades and a mounting structure therefor including means providing for rotation of the set about a common upwardly-directed axis and means providing for movements of one blade with respect to another forwardly and rearwardly in the general path or travel thereof in addition to the common rotative movement of the set.

14. An aircraft having a set of movable sustaining blades actuable by relative air-flow and a mounting structure therefor including means providing for rotation of the set about a common upwardly-directed axis under the action of such air-flow and means providing for movements of one blade with respect to another in the general path of travel thereof in addition to the common rotative movement of the set.

15. An aircraft including a set of movable sustaining blades and a mounting for the blades having means providing for rotation thereof about a common upwardly-directed axis and means for relative displacement movements of the blades, in addition to the common rotation thereof, at least in their outer end portions and at least in a path forwardly and rearwardly within the general path of travel of the set of blades, whereby the blades are free to assume positions of equilibrium between the aerodynamical and other forces to which they are subjected during operation of the craft.

16. An aircraft including a set of sustaining blades actuable by relative air-flow and a mounting for the blades having means providing for rotation thereof about a common upwardly-directed axis under the action of such air-flow and means for relative displacement movements of the blades, in addition to the common rotation thereof, at least in their outer end portions and at least in a path comprised within the general path of travel of the set of blades, whereby the blades are free to assume positions of equilibrium between the aerodynamical and other forces to which they are subjected during operation of the craft.

17. In an aircraft, a rotating sustaining wing system including a substantially upright axis structure, wings positioned therearound, and for each wing a connection to said axis structure including an individual pivot axis providing for swinging movement of the wing forwardly and rearwardly in the general path of its rotative travel whereby to compensate for irregularities in flight forces, each wing being restrained as against bodily rocking about its own longitudinal axis.

18. In an aircraft, an air driven rotating sustaining wing system including a substantially upright axis structure mounted for free rotation, wings positioned therearound for free rotation under the action of relative air-flow in flight, and for each wing a connection to said axis structure including an individual pivot axis providing for swinging movement of the wing forwardly and rearwardly in the general path of its rotative travel whereby to compensate for irregularities in flight forces, each wing being restrained as against bodily rocking about its own longitudinal axis.

19. For an aircraft with its ordinary means of forward propulsion, an air-rotated sustaining wing system actuated in normal flight by air-flow produced by the relative translational movement of the craft effected primarily by such propulsion of the craft in forward flight and primarily by downward movement of the craft during descent, whereby such system as a whole in normal operation may encounter the air stream at various angles over a wide range, said system including a generally upright axis structure mounted for normally free rotation, and wing means mounted thereon for rotative actuation by the relative air-flow produced by the flight of the craft, said wing means being flexible whereby to compensate for irregularities in flight forces thereon.

20. In an aircraft, a sustaining-wing rotor including a generally upright axis structure mounted for normally free rotation, and wing means mounted thereon for rotative actuation by the relative air-flow produced by the flight of the craft, said wing means being flexible at least in a direction comprised within the general path of rotative travel whereby to compensate for irregularities in flight forces thereon.

21. For an aircraft having its means of forward propulsion, a sustaining system comprising a generally upright axis structure mounted for normally free rotation, sustaining blade or wing means so positioned as to be rotated about the axis under the aerodynamic action of relative air-flow, means providing for movements of the wing means, in addition to the rotative movement, under the action of aerodynamic forces, and yielding means for controlling said additional movements of the wing means.

22. An aircraft having a set of sustaining blades or wings, a mounting structure for the blades providing for rotation of the set about a common generally vertical axis and for blade displacement movements in addition to their common rotation, said blades being fixed as against bodily change in pitch-setting in flight, and means yieldingly resisting displacements.

23. For aircraft, a supporting system comprising freely rotative wings hingedly connected to their common axis of rotation and yieldable means acting on the wings to restrict within suitable limits their vertical swinging movement about the axes of the hinge joints.

24. In an air-rotatable wing device of the character described, pivot means for the wing, a device yieldingly-resistive to pivotal movement of the wing mounted in large part within the wing, and an operating member therefor extending outside the wing.

25. For aircraft, a supporting system comprising rotative wings, a hub member suitably connected to the body of the aircraft and constituting the common axis of rotation of said wings, articulated joints connecting the roots of the wings to the said hub member and permitting independent angular displacement of the wings in two planes which are at right angles to one another and yieldable connecting members between the wings to restrict their relative angular displacement in one of said planes.

26. For aircraft, a supporting system comprising rotative wings, a hub member suitably connected to the body of the aircraft and constituting the common axis of rotation of the wings, hinge joints connecting the roots of the wings independently to the said member and permitting said wings to swing above and below the mean plane of rotation in response to the centrifugal and lift forces upon them during rotation, secondary hinge joints having axes substantially parallel to the general axis of rotation and permitting relative angular displacement of the wings in the plane of rotation, and yieldable connecting members between the wings to restrict within suitable limits such relative angular displacement.

27. An aircraft having a set of normally air-actuated sustaining blades or wings, a mounting structure for the blades providing for free rotation of the set about a common generally vertical axis and for blade displacement movements in addition to their common rotation, and means for controlling displacements, said means including blade interconnections.

28. An aircraft having a set of normally air-actuated sustaining blades or wings, a mounting structure for the blades providing for free rotation of the set about a common generally vertical axis and for blade displacement movements in addition to their common rotation, and means for controlling displacements, said means including a resilient member reacting between blades.

29. An aircraft having a set of sustaining blades and a mounting therefor including means providing for rotation of the set about a common upwardly-directed axis and means providing for pivotal movement of one blade with respect to another at least in the general path of travel thereof in addition to the common rotation of the set, together with spring means for resisting pivotal movement.

30. An aircraft having a set of sustaining blades and a mounting therefor including means providing for rotation of the set about a common upwardly-directed axis and means providing for relative pivotal movements of the blades in and with respect to the general path of travel thereof, together with means for controlling at least some pivotal movements.

31. For an aircraft, a normally air-driven sustaining wing system including a common upwardly-extending axis, sustaining blades or wings constructed and positioned for rotation about said axis under the action of relative air-flow, mounting means for said blades or wings securing them as against bodily rocking about their longitudinal axes under the action of the air-flow in flight and including flexible means providing for normal swinging movements of the blades or wings in a plurality of planes under the action of variable air-flow and other forces in flight, and means tending to prevent excessive displacement of the blades or wings toward and away from each other.

32. An aircraft having a set of sustaining blades and a mounting therefor including means providing for rotation of the set about a common upwardly-directed axis and means providing for relative pivotal movements of the blades in and with respect to the general path of travel thereof, together with means for controlling at least some pivotal movements including separate mechanisms for controlling pivotal movements in and with respect to the general path of travel of the set of blades.

33. For an aircraft, a normally air driven rotative sustaining wing system including a freely rotative axis structure, wing means positioned and mounted for rotative actuation thereabout under the action of relative air-flow in flight, and flexible means for mounting said wing means on said axis structure constructed and arranged to restrain said wing means as against bodily shift in pitch setting on said axis in normal flight, said flexible mounting means including an individual wing pivot joint disposed in the general plane of the wing means, whereby bending and other stresses due to centrifugal, lift and other forces are minimized.

34. A rotative sustaining wing system for aircraft, including a generally upright rotational axis, wing means mounted to rotate thereabout, and means for connecting said wing means to said axis structure including a pivot joint providing an axis generally transverse the longitudinal axis of the wing means, said joint lying substantially in the plane thereof, and said wing means being so positioned as to be normally autorotated by relative airflow.

35. A rotative sustaining wing system for aircraft, including a generally upright normally freely rotative axis, wing means mounted and positioned to rotate thereabout by the aerodynamic action of relative airflow, and means for mounting said wing means on said axis structure including a substantially horizontal pivot axis located approximately in the plane of the wing means.

36. A rotative sustaining wing system for aircraft, including a generally upright rotational axis, wing means mounted to rotate thereabout, and means for connecting said wing means to said axis structure including a substantially vertically pivoted joint located approximately in the plane of the wing means.

37. For an aircraft with its ordinary means of forward propulsion, an air-rotated sustaining wing system actuated in normal flight by air-flow produced by the relative translational movement of the craft effected primarily by such propulsion of the craft in forward flight and primarily by downward movement of the craft during descent, whereby such system as a whole in normal operation may encounter the air stream at various angles over a wide range, said system including a generally upright normally freely rotative axis, wing means mounted and positioned to rotate thereabout by the aerodynamic action of the air-pressure thereon, and means for mounting said wing means on said axis structure including a substantially horizontal pivot axis located approximately in the plane of the wing means.

38. For an aircraft with its ordinary means of forward propulsion, an air-rotated sustaining wing system actuated in normal flight by air-flow produced by the relative translational movement of the craft effected primarily by such propulsion of the craft in forward flight and primarily by downward movement of the craft during descent, whereby such system as a whole in normal operation may encounter the air stream at various angles over a wide range, said system including at least a pair of opposite sustaining blades or wings arranged for autorotation about a generally upright axis under the influence of aerodynamic action, mounting means for said wings constructed to restrain said wings as against bodily shift relative to each other about their general longitudinal axes, and means providing for upward and downward swinging movement of the effective sustaining portions of said wings, said last mentioned means including pivotal mounting mechanism for the wings located substantially in the general rotative plane thereof.

39. An aircraft having a rotary sustaining system including a plurality of sustaining blades or wings arranged for autorotation about a generally upright axis under the influence of aerodynamic action, and mounting means for the wings providing for upward and downward swinging movement of at least a portion thereof under the influence of varying flight forces, said mounting means including a pivot having an axis located substantially within the general plane of rotation of the system and extended at an angle to the longitudinal axis of the effective sustaining portion of the wings.

40. For an aircraft, a normally air-actuated sustaining rotor including a rotative hub or spindle structure mounted to be normally freely rotatable on an upright axis, a rotative wing positioned to be autorotated by the aerodynamic reaction resulting from relative airflow, and a pivotal or oscillative mounting for the wing on the hub structure to provide for automatic variation in aerodynamical angle of attack, said pivotal mounting being located substantially at the plane of the wing whereby to minimize stresses on the rotor as set up by the aerodynamic autorotation and oscillation of the wing.

JUAN DE LA CIERVA.